United States Patent [19]

ten Berge et al.

[11] Patent Number: 5,035,482

[45] Date of Patent: Jul. 30, 1991

[54] OPTICAL SWITCH

[75] Inventors: Eduardus F. A. ten Berge, Drunen, Netherlands; Gerardus M. van Alst, New Cumberland, Pa.

[73] Assignee: AMP Incorporated, Harrisburg, Pa.

[21] Appl. No.: 334,021

[22] Filed: Apr. 6, 1989

[51] Int. Cl.$^5$ .............................................. G02B 6/36
[52] U.S. Cl. ............................. 350/96.20; 350/96.21; 350/96.22
[58] Field of Search ............... 350/96.15, 96.20, 96.21, 350/96.22

[56] References Cited

U.S. PATENT DOCUMENTS

| | | | |
|---|---|---|---|
| 4,152,043 | 5/1979 | Albanese | 350/96.20 |
| 4,189,206 | 2/1980 | Terai et al. | 350/96.20 |
| 4,204,744 | 5/1980 | Wittmann | 350/96.20 |
| 4,652,081 | 3/1987 | Fatatry | 350/96.20 |
| 4,657,339 | 4/1987 | Fick | 350/96.20 |

FOREIGN PATENT DOCUMENTS

| | | | |
|---|---|---|---|
| 0256348 | 2/1988 | European Pat. Off. | 350/96.13 |
| 3012450 | 10/1981 | Fed. Rep. of Germany | 350/96.20 |
| 2412084 | 7/1979 | France | 350/96.20 |
| 2479993 | 10/1981 | France | 350/96.15 |
| 2088083 | 6/1982 | United Kingdom | 350/96.13 |
| 2107481 | 4/1983 | United Kingdom | 350/96.10 |
| 2176023 | 12/1986 | United Kingdom | 350/96.20 |
| 80/01720 | 8/1980 | World Int. Prop. O. | 350/96.20 |

OTHER PUBLICATIONS

"Mechanical Optic-Fiber Switch", by Hale, Electronics letters, 22nd Jul. 1976, vol. 12, No. 15.
"Bistable Optical Fibre Switch", by Dahne, Electronics Letters, 14th Aug. 1980, vol. 16, No. 17.

*Primary Examiner*—Frank Gonzalez
*Attorney, Agent, or Firm*—Bruce J. Wolstoncroft; Eric J. Groen

[57] ABSTRACT

A switch for optical fibers includes two identical housing halves for retaining the optical fibers in a substantially fixed position. The fibers are retained within the housing halves forming two pairs of opposed optical fibers. An intermediate fiber is provided between the opposed fibers, and each end of the intermediate fiber is moveable into alignment with one of two fibers to form four switching positions. The intermediate optical fiber is externally plated with a metallic coating which provides a resiliency to the fiber, allowing the fiber to provide its own spring retention within an associated alignment groove. A switching plate is also provided for each free end of the intermediate fiber for switching movement of the free ends into optical alignment with the free ends of the optical fibers. Transverse movement also axially moves the optically aligned fiber out of an abutting relationship with the free end of the intermediate fiber to maintain the surface finish on the ends of the optical fibers. The switch can also be made in the form of an electromagnetic switch where end portions of optical fibers having ferromagnetic metal coatings of constant thickness are secured together in pairs in an alignment channel adjacent a solenoid. The pair of fiber end portions are fixed adjacent one channel sidewall and the pair are movable by activation of the solenoid from a position in which they are inherently spring-biased against the opposite sidewall with only fibers and in optical alignment to a position in which they abut sidewall bringing fibers and, respectively, into alignment.

19 Claims, 9 Drawing Sheets

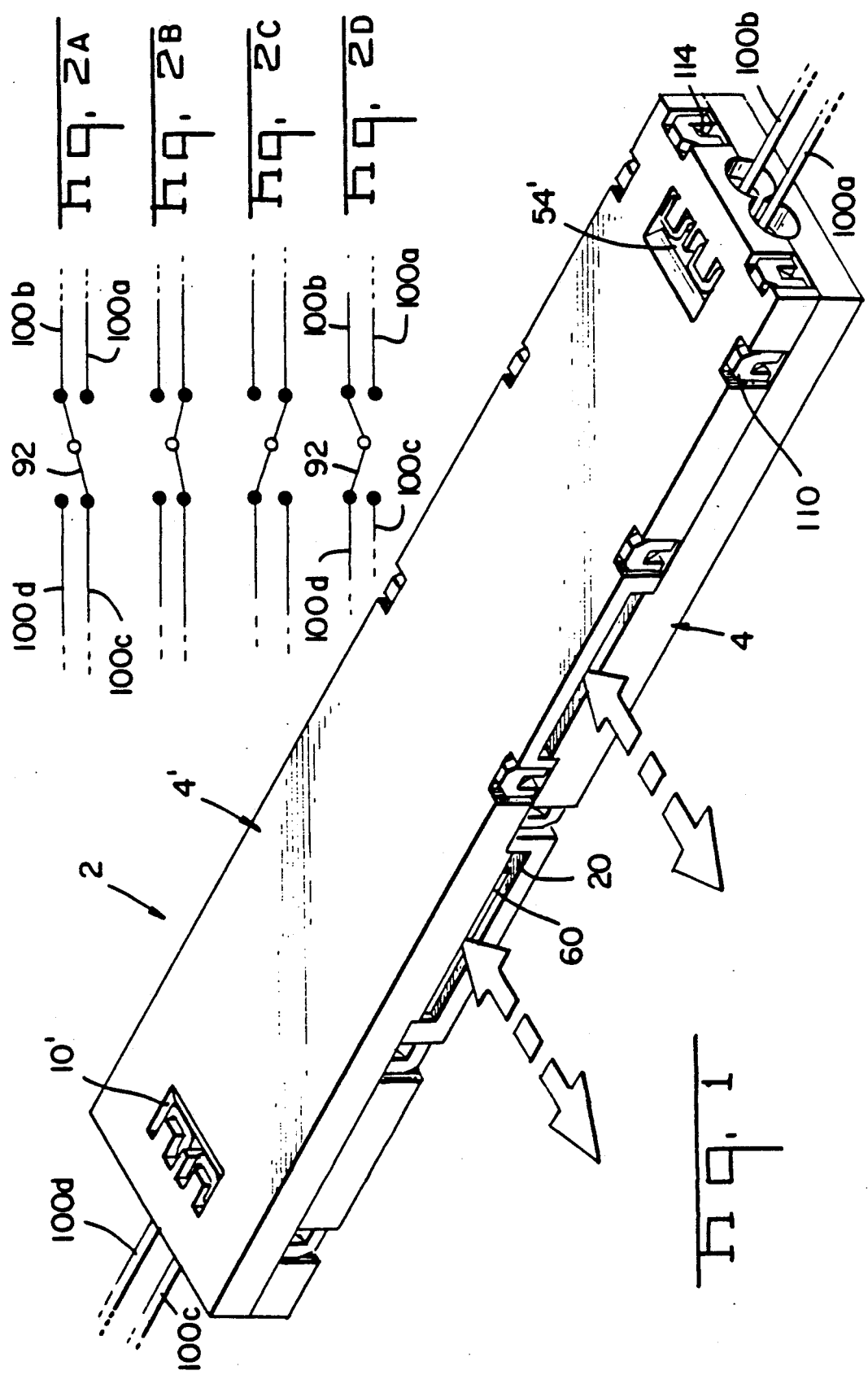

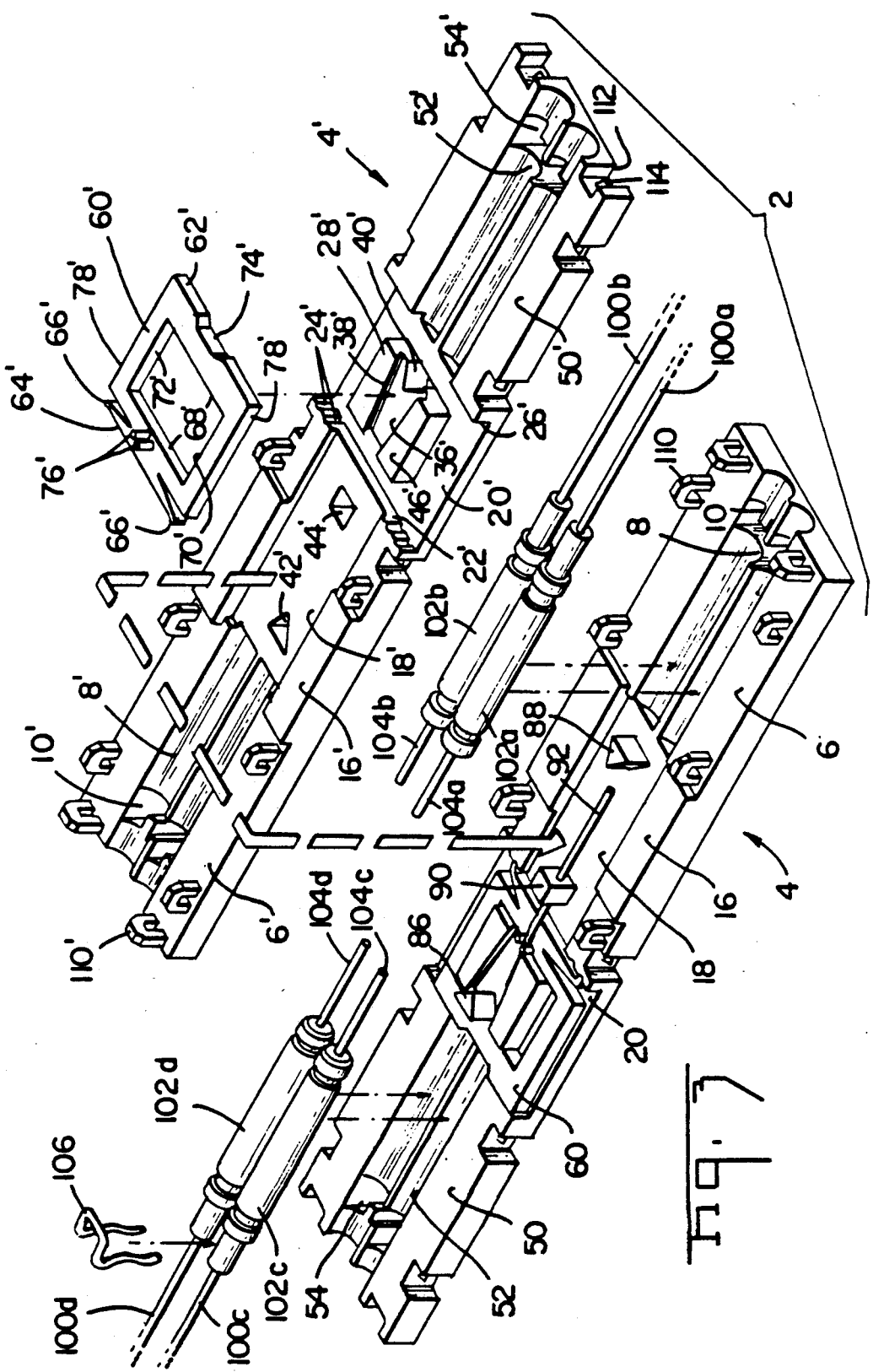

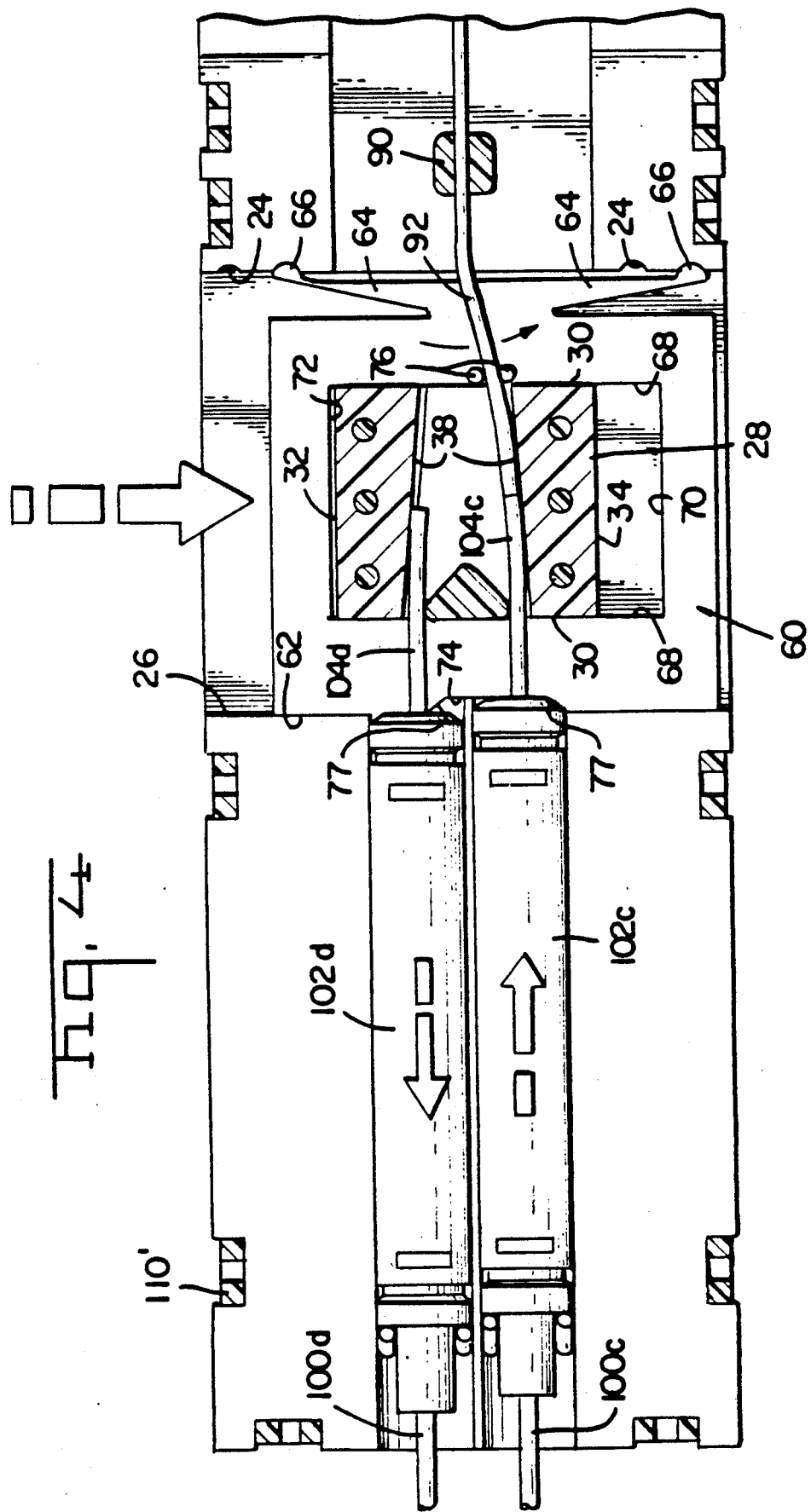

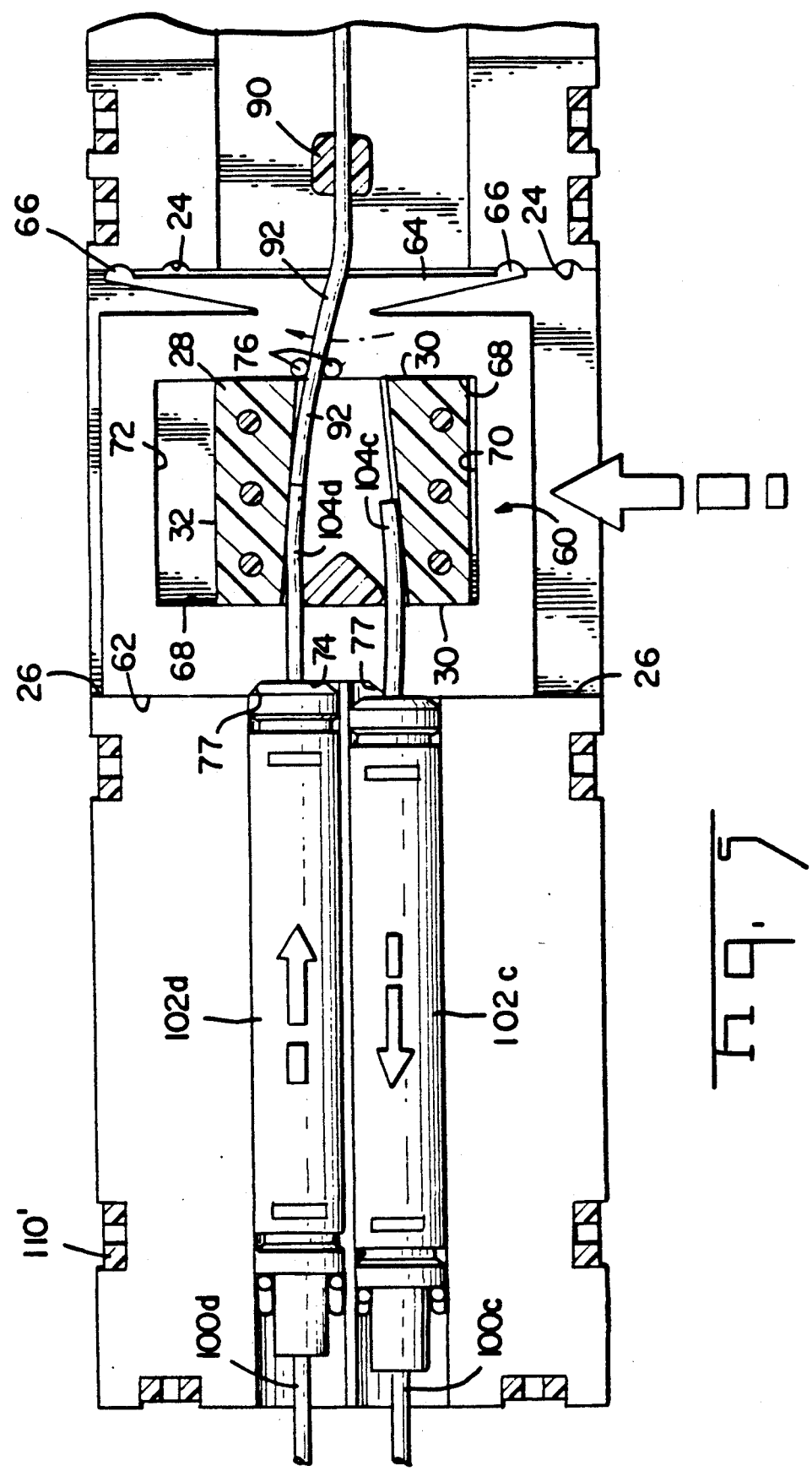

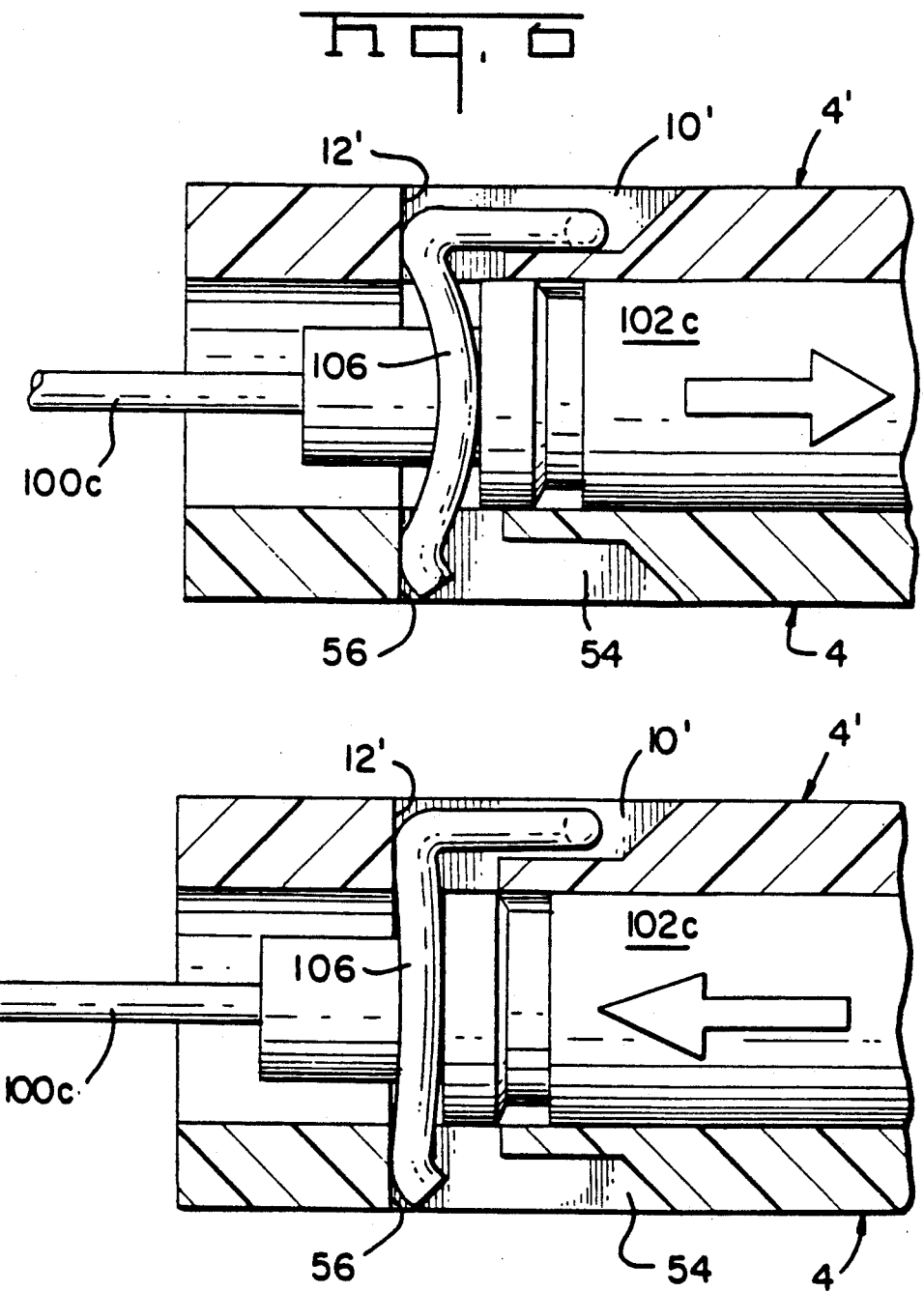

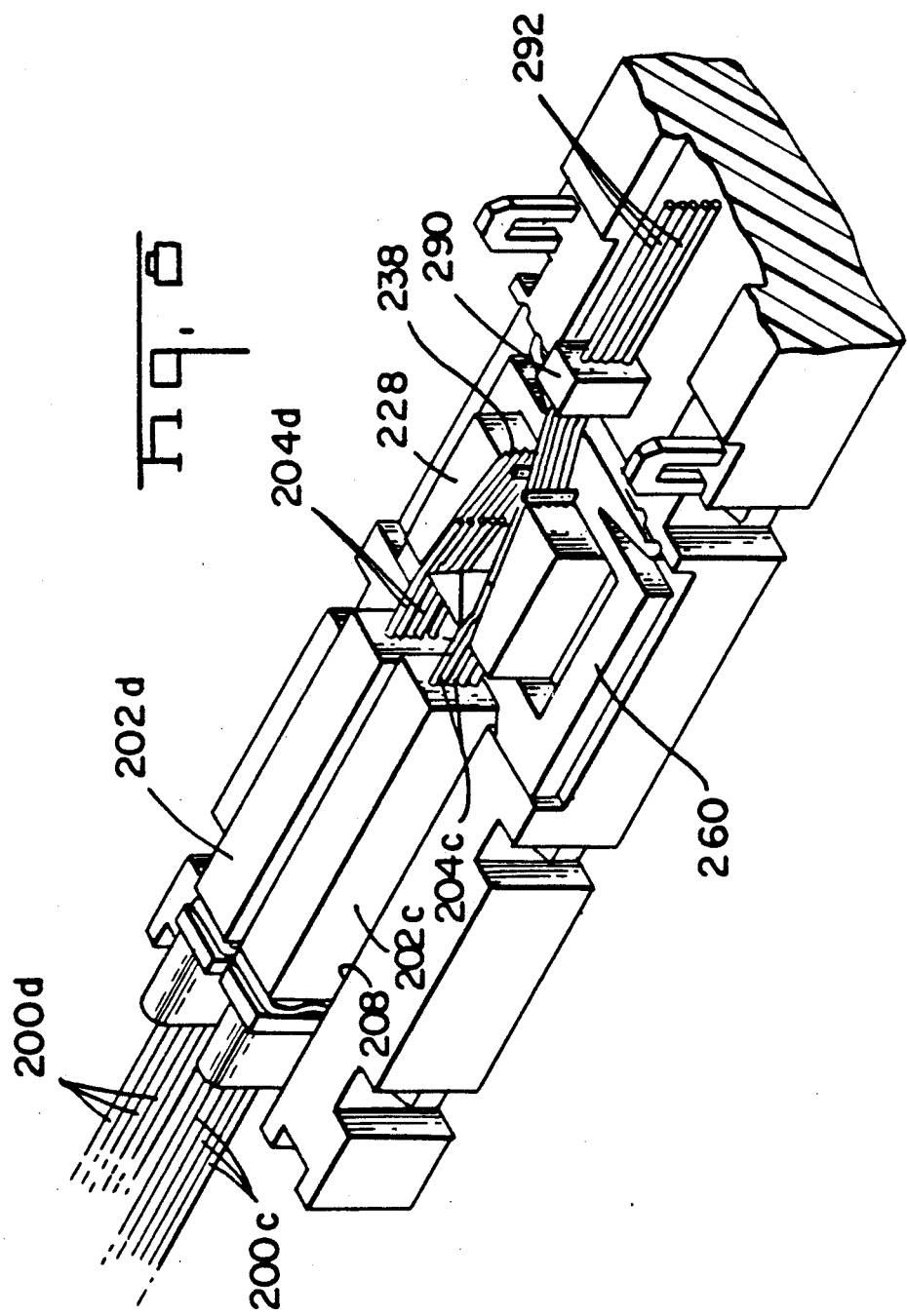

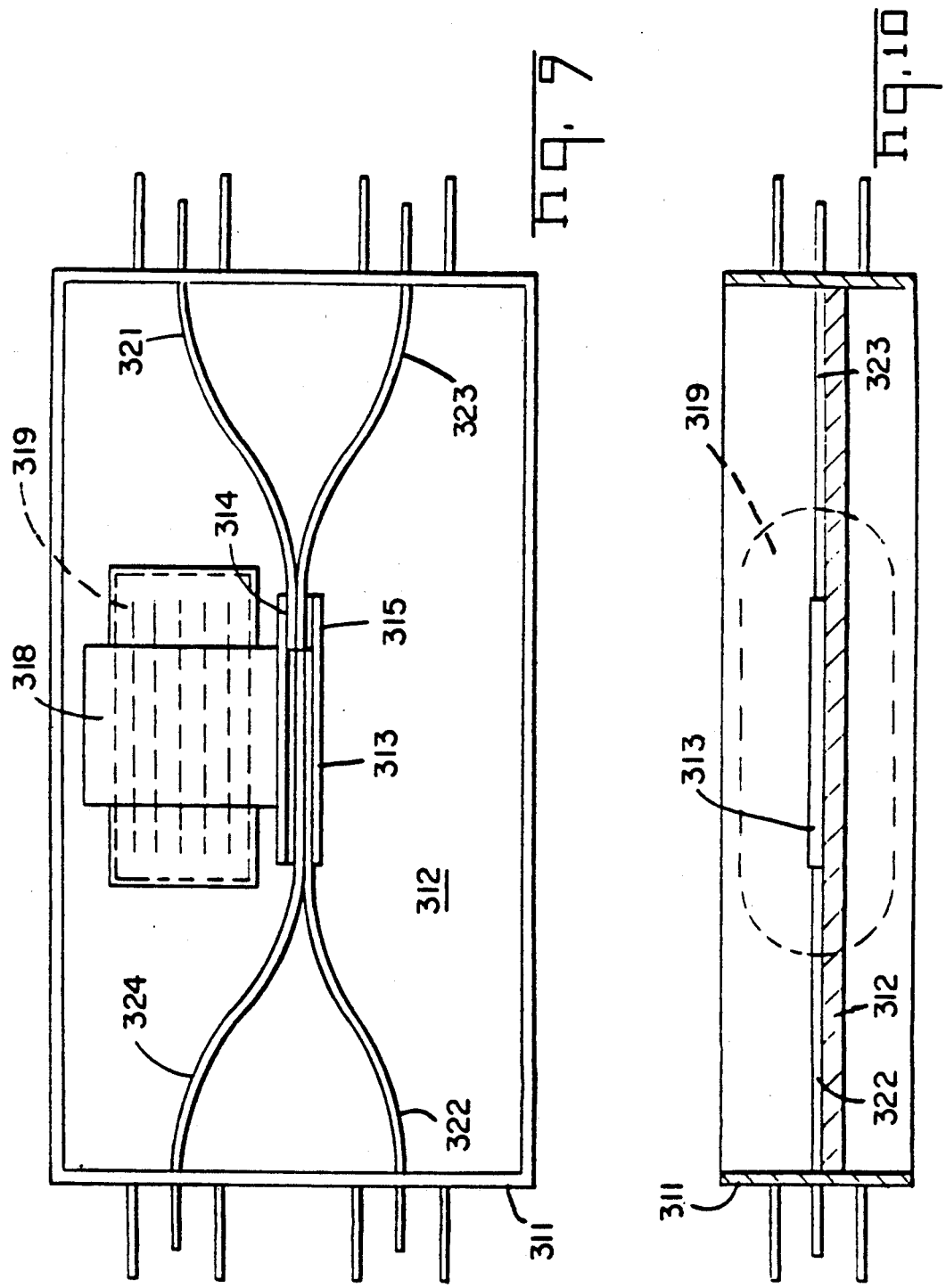

OPTICAL SWITCH

BACKGROUND OF THE INVENTION

1. Field of the Invention

The subject invention relates to a switch mechanism for aligning alternative optical fibers in optical alignment.

2. Prior Art

In one type of known electromagnetic optical switch, first and second optical fibers have respective first and second end portions mounted for relative lateral movement to bring optical end faces into and out of optical alignment in different switching positions, which fiber end portions are fixed, for example by adhesive, in grooves provided in respective ferromagnetic metal carrier blocks, the first of which is normally stationary, the second movable forming the switch armature.

However, such blocks must be machined and mounted with a high degree of precision to achieve the precise alignment of the optical faces of the end fibers necessary to avoid unacceptable transmission losses. In addition, the blocks are relatively massive and, furthermore, a return spring is normally required to return and retain the armature block in the OFF position of the switch. These factors contribute to the overall complexity, size and manufacturing costs of the switch.

SUMMARY OF THE INVENTION

According to one aspect of the invention, there is provided an optical switch in which the armature comprises a metal coating electroplated on the end portion of the first fiber which is mounted for the switching movement. The metal coating provides a resilient characteristic to the optical fiber which maintains the fiber in a resiliently biased position, enhancing the optical alignment of the switched optical fibers. A suitable procedure for coating the fiber is described in our European Patent Application No. 83303028.1, the disclosure of which is incorporated herein by reference. As the coating can be readily deposited to constant thickness of the fiber ensuring concentricity, the fiber end portion can be more easily mounted for switching movement into and out of optical alignment with the stationary fiber.

In a second aspect of the invention, the switch includes alignment means for aligning the first and second, and first and third optical fibers where the alignment means includes two channels for receiving the second and third fibers with end faces of the fibers facing in substantially the same direction. The first fiber is movable between the two channels into and out of alignment with either the second or third optical fiber. An actuator means is included which comprises an actuator plate guided relative to the two channels and which includes means for retaining said first fiber in a location distant from the free end of said first fiber, allowing a length of said first fiber to be freely movable within the said channels into and out of alignment with the second and third said fibers upon transverse movement of the actuator plate relative to the lengths of the optical fibers.

In a further aspect of the invention, the alignment means includes means to move the second or third optical fibers along an axial direction out of an abutting relationship with the first optical fiber prior to the transverse movement of the opposed end faces, and the second or third optical fibers into an abutting relationship when respective opposed end faces are aligned. The preferred embodiment for moving the second or third optical fibers in an axial direction includes providing a band portion around an end of the second or third optical fibers and including a recessed portion on a side edge of the switch plate member with the band portions of the second and third optical fibers in a spring loaded condition against the side edge of the switch plate with only one band portion in alignment with the recessed portion at any location of the switching plate. Transverse movement of the switching plate moves the first optical fiber into and out of optical alignment with the second or third optical fiber and the recessed portion cams the second or third optical fiber out of an abutting relationship with the first said fiber. The recessed portion of the switching plate is profiled to move either the second or third optical fiber out of an abutting relation with the first optical fiber prior to the transverse movement of the two opposed end faces of the first and second or the first and third optical fibers.

Electroplating an end of the fiber also allows the fiber to be switched by mechanical or electromagnetic means. If the switch is magnetically switched, there is provided a magnetically operated optical switch in which the armature comprises a ferromagnetic metal coating electroplated on the end portion of the second fibre which is mounted for the switching movement. This avoids a need for a relatively massive ferromagnetic metal block to carry the fibre and, as the coating can be readily deposited to constant thickness on the fibre, ensuring concentricity, the fibre end portion can be more easily mounted for switching movement into and out from optical alignment with the stationary fibre.

In the magnetically actuated version of the invention, the second optical fibre is fixed in a support at a location spaced from the optical face, and the metal coating extends along the length of the fibre between the optical face and the fixed location, the coating being such to impart a degree of resiliency to the fibre so that the length acts as a beam spring and is inherently biased into a first switch position to which it will return without a requirement for an additional return spring. Third and fourth coated end portions are secured to extend side-by-side in the same direction with the first and second fibre end portions, respectively, with their respective optical end faces coplanar so that the second and fourth end portions are movable together by the magnetic field from a position in which the optical faces of only the third and fourth end portions are in optical alignment to a position in which the optical faces of the first and fourth, and second and third end portions, are in optical alignment, respectively.

The preferred embodiment of the invention will now be described, in view of the drawings.

BRIEF DESCRIPTION OF THE DRAWINGS

FIG. 1 shows an isometric view of the assembled switch.

FIGS. 2A-2D show schematically the switching arrangements between the optical fibers.

FIG. 3 shows an isometric view of the numerous components of the fiber optic switch in an exploded manner to show the detail of the components.

FIG. 4 is an enlarged view of one switch end showing the intermediate optical fiber in a lower position.

FIG. 5 is a view similar to that of FIG. 4 wherein the switch has transferred the intermediate optical fiber to an upper position.

FIG. 6 and FIG. 7 show the positions of the fiber optic connectors when moved forward and rearward during the switching movement shown in FIGS. 4 and 5.

FIG. 8 shows an alternate embodiment of a switch where several optic fibers, in the form of ribbon optic cable, is used as the switching media.

FIG. 9 is a schematic plan view of the electromagnetic switch in the OFF position;

FIG. 10 is a side elevation of the electromagnetic switch shown in FIG. 9;

DETAILED DESCRIPTION OF THE PREFERRED EMBODIMENT

Figure 11:
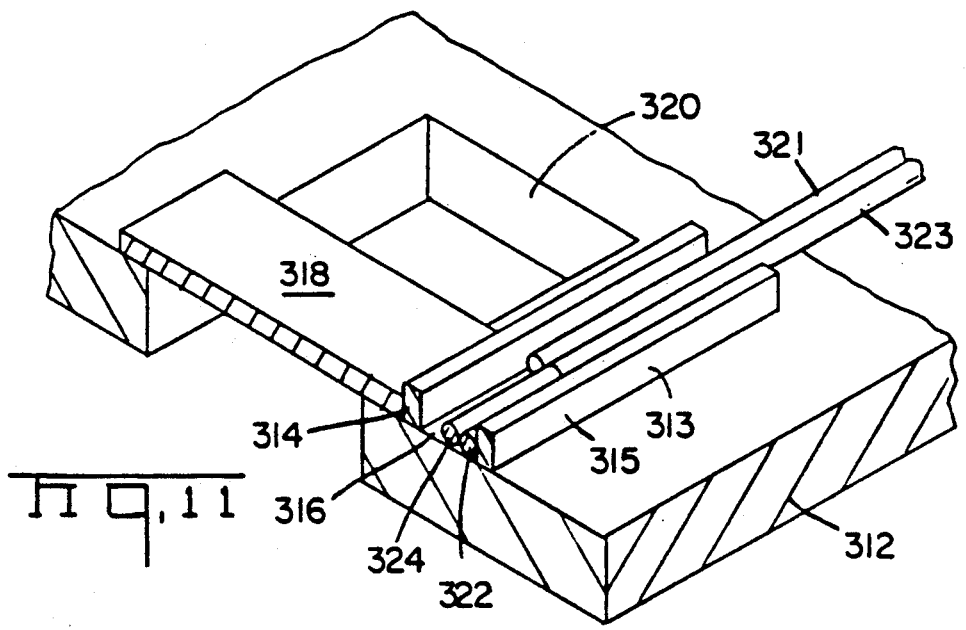
FIG. 11 is a fragmentary perspective view of the electromagnetic switch.

FIG. 1 shows an isometric view of the fiber optic switch of the instant invention in which the switch includes a plurality of switched interconnections thereby interconnecting optical fibers 100a-100b. More specifically, the switched locations are shown in FIGS. 2A-2D schematically whereby the optical fibers 100a-100d are interconnected by an intermediate optical fiber such as 92. The fiber optic switch includes two optical fibers at each end such as 100a and 100b, and two optical fibers at the opposite end such as 100c and 100d, lending to a multiple of four switched positions, as shown in FIGS. 2A-2D; thus, the switch is typically referred to as a two by two switch.

With reference to FIG. 3, the switch of the instant invention will be described in greater detail. The switch 2 includes two identical, or hermaphroditic, switch housing halves such as 4 and 4', thus while describing the details of the housing halves, only one such half will be described. It should be understood that the other housing half includes an identical component or characteristic as the one being described. It should also be noted that the second switch housing half is numbered in prime numerals to indicate the like component on the first switch housing half.

Referring first to switch housing half 4', it should be noted that a first end includes a surface 6' with semicircular fiber optic receiving troughs 8' therein. Proximate the ends of the troughs 8' and located in each trough 8' are U-shaped recesses 10'. Towards the center of the switch housing half 4' are raised surfaces 16' with a recessed surface 18' intermediate the raised surfaces 16'. Recesses 44' and 42' extend into the surface 18' and their function will be described in greater detail subsequently. The second end of the switch housing half 4' includes a switching surface 20' which is bounded by side walls 22 and 26' and includes an island 28' symmetrically located centrally of the side walls and along the axial centerline of the switch housing half. Referring momentarily to FIG. 4, it should be noted that the island 28 includes side walls 30 and a first end wall 32 and a second end wall 34. Referring back to FIG. 3 shows that the island 28' includes a recess 36' along the axial centerline of the island and includes two V-grooves 38' which converge towards the center of the switch housing half 4', as will be described subsequently. The island 28' further includes a recess 40' which in combination with recess 42' are symmetrically located with respect to the center recess 44'. It should also be noted that the side wall 22' includes two detent notches 24' located adjacent to each outer edge. The switch housing half 4' further includes a second fiber optic receiving end having a surface 50' which again includes two fiber optic receiving troughs such as 52'. Each trough 52' includes a U-shaped recess 54'.

A switching plate such as 60' includes a first side wall 62' and oppositely facing spring fingers 64' including detent nodes such as 66'. The switching plate 60' further includes inner side walls 68' and inner end walls 70' and 72'. It should be noted that the inner side walls 68' and inner end walls 70' and 72' collectively define a recess to be received over the island 28' located on surface 20' of the switching housing half 4' Switching plate 60' further includes a recess 74' along the side wall 62' centrally located therealong. Switching plate 60' also includes two pins 76' upstanding from the upper surface of the plate.

Still referring to FIG. 3, shows that the switch assembly 2 further comprises optical fibers such as 100-d which include fiber optic connectors such as 102a-d thereon allowing a free end 104a-d of the fibers to extend from the end of the connectors. The connectors could be of the type shown in our U.S. Pat. Nos. 4,435,038; and 4,669,820. Although a connector is described, a band portion could be included around the fiber adding further rigidity as required for the switching operation. As mentioned earlier, the optical fibers are plated externally with a metallic coating to provide a resilient nature to the optical fiber. For this reason, the device comprising the plated optical fiber is sometimes referred to as an optical needle.

The switch assembly 2 is assembled by placing the switching plates 60 and 60' over the respective islands 28 and 28' and between side walls 22 and 26. The switching plates 60 and 60' are so profiled that the spring fingers are in a resiliently biased condition when placed between the side walls 22 and 26 such that the spring fingers bias the side wall 62 of the switch plate against the side wall 26 of the switch housing half 4. An intermediate optical fiber 92, which includes an integrally formed insert such as 90, is then placed within the aperture 44 of the center of the plate 4 with free ends of the needle 92 laced between respective pins 76 of the switch plate 60. The inserts 6 and 88 are also inserted at this time, into respective apertures 40 and 42. It should be noted that the housing half 4' includes apertures 40', 42' and 44' which will overlie the respective inserts 88, 86 and 90, thereby retaining the inserts in a fixed relationship. The switch housing half 4' further includes complementary troughs 52' and 8' which will overlie the includes latching arms such as 110, 110' and complementary recesses 112, 112' including latching surfaces 114, 114' thereby latching the two housing halves together.

Once the two housing halves 4, 4' are latched together, the fiber optic connectors 102a-d are then slid into place from the openings formed by the overlapping troughs, with the fiber optic ends 104a-d, respectively, located within the V-grooves such as 38. The connectors are placed within the openings such that the optic fiber ends are positioned between the inserts 86, 88 and between the V-grooves 38, 38'. As noted before, the V-grooves 38 are inwardly converging and the exterior of the optical fibers are plated with a metallic material, such that the fiber optic ends 104a and 104b become spring biased within the V-grooves 38.

Once the two housing halves are sandwiched together and the connectors 102a-d are inserted, U-shaped retaining springs such as 106 can be placed within the spring receiving apertures formed by recess 10 and 54' at one end and 10' and 54 at the opposite end. As shown in FIG. 6, the recess 10' includes a back surface 12' while the recess 54 includes a rear surface 56. Thus, the U-shaped spring 106 is spring biased against an end of the fiber optic connectors 102a-102d and end surfaces 12' and 56. It should be understood by the sequence of assembly that the connectors and associated optic fibers are removable and reinsertable without disassembling the housing halves. With the switch so assembled, the operation can be described in greater detail.

Referring to FIG. 4, the switch plate 60 is shown in a lower position where end wall 32 of the island 28 is adjacent to the end wall 72 of the switch plate while inner end wall 70 of the switch plate is spaced from the end wall 34 of the island 28. It should be noted that the switch plate 60 is movable in the opposite direction, to a position as shown in FIG. 5, to the extent of the space between surfaces 34 and 70. It should also be noted that the pairs of detents 24 are appropriately spaced such that the detent nodes 66 on the spring fingers 64 are appropriately located within the detents 24 when the switch plate is moved into the upper or lower position. As shown in FIG. 4, the intermediate optical fiber 92 is placed between the two pins 76 on the switch plate which retains the optical fiber 92 in a resiliently biased condition within the V-groove 38 of the island such that the two end faces of the optical fibers 104c and 92 are in an abutting condition. An important aspect of the instant invention is that the switch plate 60 includes the recess 74 which allows the fiber optic connectors 102a-d to be axially movable within their respective trough such that the end face of the optical fibers 104a-d are movable towards and away from the end faces of optical fiber 92. It is important for the optical transmission of the signals for the end faces to be in an abutting relationship. However, it is detrimental to the durability of the end faces, if the end faces of the optical fibers are in an abutting relationship when the abutting fibers are switched out of a mating relationship, as the movement of the two fibers transversely can harm the end optical surfaces of the fibers. Advantageously, the recess 74 includes a ramped surface such as 77, which cams against the end of one of the respective connectors such as 102c or 102d, to move the connector away from and out of an abutting relationship with the optical fiber 92.

For example, FIG. 4 shows connector 102c forward of the connector 102d such that the inward end of the connector 102c lies within the recess 74 of the switch plate 60. This allows the end face of optical fiber 104d to be in an abutting relationship with the end face of the intermediate optical fiber 92. However, when the switch plate 60 is moved upward to the position shown in FIG. 5, the camming surface 77 moves the connector 102c rearwardly, taking the end face of the optical fiber 104c out of an abutting relationship with the end face of the optical fiber 92 prior to the transverse movement of the two faces across each other. When the switch plate 60 is moved into its fully upward position, as shown in FIG. 5, the fiber optic connector 102d can then move inwardly into the recess 74 and the end face of the optical fiber 104d can move into an abutting relationship with the end face of the optical fiber 92. FIGS. 6 and 7 illustrate how the U-shaped retaining spring is located within the apertures formed by the respective recesses 10 and 54 such that the U-shaped clips maintain a constant inward force on the ends of the connector. Thus, FIG. 6 would be illustrative of the position of fiber optic connector 102c in the position shown in FIG. 4, while FIG. 7 would be illustrative of the fiber optic connector 102d shown in FIG. 4.

Advantageously, the spring fingers 64 retain the plate 60 within the housing half 4 such that the side edge 62 is in an abutting manner against the sidewall 26. In this manner, the detents 24 and spring fingers 64 have a positive latching position. The ends of the connectors 102c, 102d, adjacent to the recess 74, are actually in a noncontacting relationship with the recess 74. In this manner, the end faces of the optical fibers 104c, 104d are axially spring loaded into the end faces of the optical face of the intermediate needle. In this manner, the two mating needle faces are axially spring loaded and, furthermore, this allows more tolerance within the system design. Over extension of the end faces of the optical fibers 104a-d is allowable as the intermediate optical fiber 92 is somewhat free to move at each end within respective pins 76, 76'. The two end faces will however, always be in a biased relationship against each other as the plated optical fiber spring loads the two end faces together.

As best shown in FIG. 1, the two housing halves include openings for access to the end walls 78 and 78' of the switch plates 60, 60' such that the switch plates can be activated by means exterior of the switch housing formed by the two housing halves 4 and 4'. If a simple switching operation is to be used where simultaneous and instantaneous switching is not required, the switch plates 60 could simply include tabs which would protrude through the recesses for manual switching by an operator's hand. However, if simultaneous and instantaneous switching is required, such as where a new fiber optic cable is being inserted within a transmission line where the length of the new optical fiber being inserted is substantial, the switches 2 could include an electromechanical switching mechanism such as a solenoid which could be activated by a radiocontrolled mechanism. In this manner, the switches at opposite ends could be activated instantaneously thereby precluding transmission loss within the fiber.

The preferred embodiment of the invention includes an optical fiber which is externally plated with a metallic coating, which provides several advantages not before available in such switches. By using an optical needle for the switching media, the switching mass is reduced to a minimum to allow high speed switching with low bounce. Furthermore, by using an optical needle, the needle provides for its own spring force maintaining the needle accurately within its alignment grooves, without the necessity of an external compression member.

Further advantages relate to the superior alignment characteristics of the needles which in effect relates to a superior interconnection. First, an optical needle can be precisely plated such that the optical fiber can be eccentric relative to the plating diameter. In this manner, the alignment of the centers of the fibers is precisely aligned by placing each of the fibers in an alignment means such as a V-groove. Secondly, fibers can be prepared in such a manner to eliminate such reflection losses as Fresnel losses, by including as part of the exterior plating, convex endfaces. Alternatively, the needles can include an anti-reflection coating on the needle ends with the fiber recessed from the end of the coating. This coating is not possible with other connectors as other connectors include such ingredients as glues, which cannot withstand the extreme temperatures, as can the optical needle.

By using an optical needle as the switching media, a double switch can be made such that at both sides of a manhole, switching is possible. This is due to the quality of the alignment of the two ends of the needle. In fact the losses with this switch can be maintained within 1 db over the total switch.

As a second embodiment of the instant invention, attention is drawn to FIG. 8 in which an array of needles, typically referred to as a ribbon fiber cable, are used as the switching media rather than a single needle. For simplicity, FIG. 8 only shows a cutaway portion of the switch, although it should be understood that the housing halves 204, 204' are identical.

In this embodiment, several intermediate needles 292 are included which can be switched into and out of contact with the optic fibers 204a-d. The island 228 includes a plurality of V-grooves to receive the respective needles to align the optic fiber ends with the ends of the intermediate optic fibers 292. The housing half 204 includes square channels 208 to receive the arrays of optic fibers which are interconnected by a connector for ribbon fiber cable, or simply by a splicing box in which the several fibers are fused or adhesively affixed within the splice box. In all other respects, the second embodiment is the same as the first embodiment, the housings are of course modified somewhat to accomodate the plurality of optic fibers.

As a result of the intermediate needle being plated with a metallic material, the intermediate needle is also applicable with the use of a magnet to control the movement of the needle. As shown particularly in FIGS. 9 and 10, as a further embodiment of the instant invention, an electromagnetic switch comprises an outer, rectangular, housing frame 311 supporting a base plate 312, at a central area of which is mounted an optical fibre alignment channel 313. The channel comprises first and second sidewalls 314 and 315 and a floor 316, and is precisely dimensioned to be of width equal to treble the diametric width of end portions of optical fibres.

Figure 12:
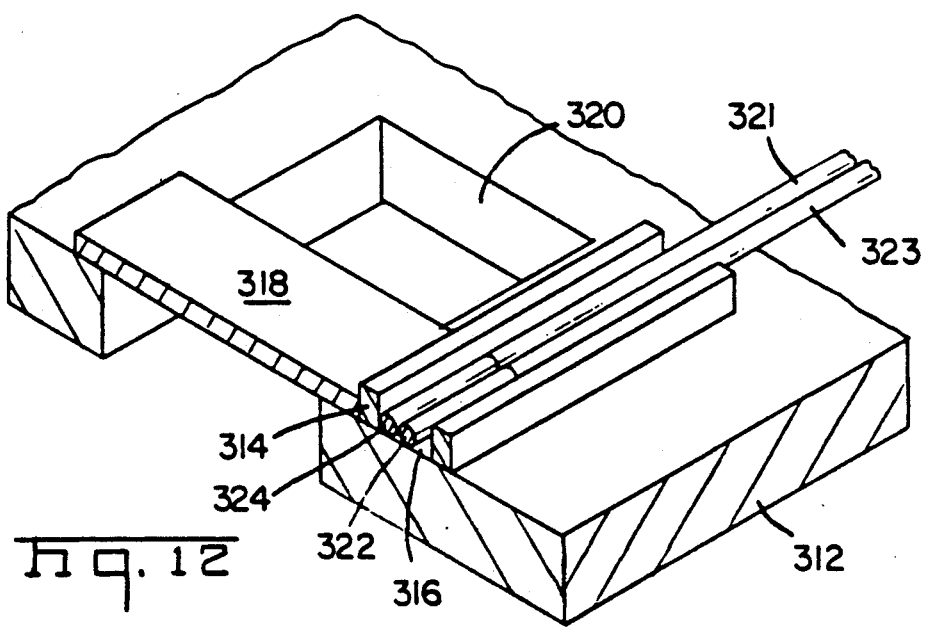
FIG. 12 is a fragmentary perspective view of the electromagnetic switch in the ON position.

The solenoid 318 of an electromagnet 319 is also mounted on the base plate adjacent the channel to extend perpendicularly away from a central location of the channel, the windings being received in a cut-out 320 in the base plate (FIGS. 11 and 12).

Four discrete lengths of optical fibres 321-324, which have been electroplated to provide a ferromagnetic metal coating of constant thickness and each formed with optical faces on opposite ends as described in the above-mentioned patent application, are mounted within the frame The coated fibres 321 and 323 are each secured at one end in laterally spaced-apart relation in the frame 311 so that they extend out of the housing for splicing or releasably plugging to fibres of a subscriber or work station and a network ring, respectively, using the method described in the above-mentioned patent application. Their other end portions enter one end of the channel 313 and are fixed therein to extend along the floor 316 in the same sense and in side-by-side abutment with optical end faces coplanar and the end portion of fibre 321 in abutment with the corner defined between channel sidewall 314 and the floor 316.

Figure 14:
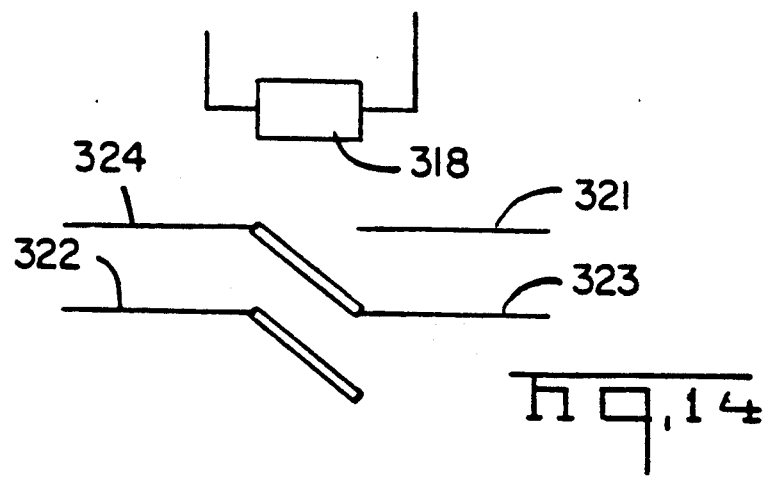

The coated fibres 322 and 324 are similarly secured at one end in laterally spaced-apart relation in the frame 311 to extend out of the housing for similar splicing or direct releasable connection to fibres of the subscriber or work station and of the network ring, respectively. Their other end portions enter the other end of the channel and are joined together to extend along the floor 316 in the same sense and in side-by-side abutment with optical end faces coplanar. The coated fibre has a stiffly resilient property, the two fibres resembling a wishbone spring, enabling the joined ends to be laterally biased towards the sidewall 315 of the channel with the end portion of fibre 322 abutting the corner defined between sidewall 315 and the floor 316, as shown in FIGS. 9 and 11. In this condition, the switch is OFF and the optical faces only of fibres 323 and 324 are aligned so that the network ring, of which fibre 323 is the emitter and fibre 324 the receiver, is closed excluding the subscriber or work station linked to fibres 321 and 322. This is the circuit condition shown in FIG. 14.

Figure 13:
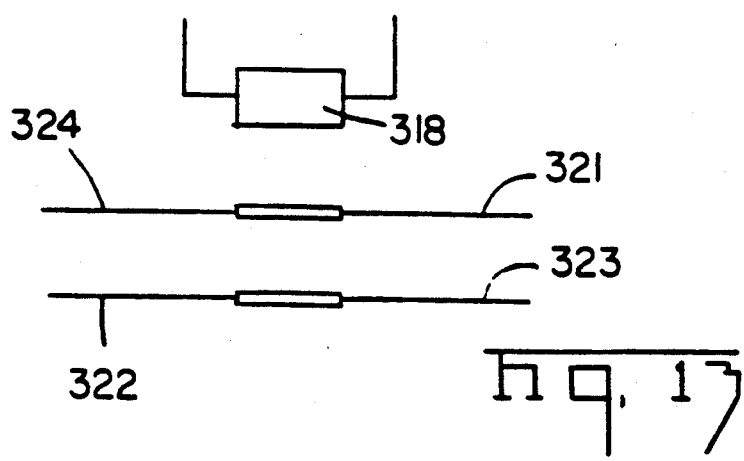
FIG. 13 is a circuit diagram of the electromagnetic switch in the ON position; and, FIG. 14 is a circuit diagram of the electromagnetic switch in the OFF position.

Operation of the electromagnet moves end portions of fibres 322 and 324 together laterally across the channel until the end portion of fibre 324 abuts the corner defined at sidewall 314. In this condition, the ON condition of the switch, the subscriber or work station is linked or hooked into the network ring by reason of the optical alignment of optical faces of fibres 321 and 324, and 322 and 323, respectively, as shown in FIGS. 12 and 13.

The precise dimensioning of the channel width ensures precise optical alignment of the fibres in both switch positions, minimizing interface transmission losses, while the switch structure is extremely simple and compact, requiring few parts, facilitating economic manufacture. An additional advantage is that the switch can be used as a connector, as the coated end portions are of sufficient size and strength to be plugged directly into a connector of complementary shape.

The instant invention was described by way of preferred embodiments but they should not be taken to limit the scope of the claims; the appended claims being added for that purpose.

We claim:

1. An optical switch for varying the light path of an optical fiber includes a first optical fiber having a secured end and a free end, means for switching said free end of said fiber between first and second positions placing said free end of said first optical fiber into optional abutment with end faces of either a second or third optical fiber held within a switch housing, and alignment means for alternatively optically aligning said first fiber with either said second or third optical fiber with end faces of said fibers in optical abutment, the switch being characterized in that:

said second and third optical fibers include an exterior coating formed by a metallic plated material providing a resilient fiber end, said alignment means includes two V-grooves within said switch housing facing each other with said first optical fiber disposed in the space between said two facing V-grooves, said switching means being operable to move said first fiber between said two facing V-grooves into optical abutment with either said first or second fiber, said resiliency in said second and third fiber ends spring loading at least a portion of said plated fiber ends of said second and third fibers within and against a portion of said respective V-groove providing precise alignment of said two abutting optical fiber ends.

2. An optical switch according to claim 1, wherein second and third optical fibers reside within a length of said V-grooves and said V-groove converge inwardly away from said second and third fibers to bend said second and third fibers slightly in said V-grooves, precisely positioning said second and third fibers against said V-grooves.

3. An optical switch according to claim 2, further comprising means to move said second and third fibers axially within said V-grooves upon actuation of said switching means.

4. An optical switch according to claim 3, wherein said axially moving means comprises camming means cooperable with said switching means.

5. An optical switch according to claim 4, wherein said second and third optical fibers are axially spring-loaded towards said first optical fiber.

6. An optical switch according to claim 5, wherein said switching means comprises a switching plate laterally movable within said housing, said switching plate being operably connected to an end of said first fiber to move said first fiber into and out of alignment with said second and third fibers, upon the lateral movement of said switching plate.

7. An optical switch according to claim 6, wherein said camming means comprises a ramped surface at an end of said switching plate, and said second and third fibers include a band portion therearound, recessed from a free end thereof, said band portions cooperating with said ramped surface, during the lateral shifting of said switching plate, to axially shift said second or third fiber.

8. An optical switch according to claim 7, wherein said band portions are fiber optic connectors, with said second and third fibers projecting from an end thereof, and said connectors carrying said second and third fibers are spring-loaded towards said switching plate.

9. An optical switch according to claim 8, wherein said switching plate includes a recessed portion in an end thereof, with ramped surfaces leading into and out of said recess, said recessed portion adapted to partially receive an end of one of said connectors at a time, whereby when one end of one said connector is within said recessed portion, said fiber associated with said connector is aligned with said first fiber, and when said switching plate is laterally shifted, one of said ramped surfaces contacts said recessed connector thereby camming it axially away from said first fiber end, to a position where said connector abuts an end edge of said switching plate, and continued lateral shifting of said switching plate aligns the first fiber with said other fiber, and said other connector spring-loads into said recess, with the fiber in abutment with said first fiber.

10. An optical switch for varying the light path of an optical fiber includes a first optical fiber held within a switch housing which is movable by an actuator means between first and second positions which places the first optical fiber in optical alignment with either a second or third optical fiber mounted within the housing, and alignment means for optically aligning the first and second said optical fibers, and first and third optical fibers with end faces of the fibers in an opposed relationship, the alignment means including two channels for receiving the second and third fibers with end faces of the fibers facing in substantially the same direction, with the first said fiber being movable between said two channels into and out of alignment with either the second or third optical fiber, the switch being characterized in that:

said actuator means includes an actuator plate which is guided relative to said two channels and which includes means for retaining said first fiber at a location distant from a free end of said first fiber allowing a length of said first fiber to be freely movable within said channels into and out of alignment with said second or third fiber, upon lateral movement of said actuator plate relative to the lengths of said optical fibers, and in that:

said two channels are formed within an island having two side walls and two end walls, said channels extending between said two side walls within said island, said actuator plate including a recess defined by two side edges and two end edges, where said side edges are profiled for close registration with said side walls of said island, and said two end edges are spaced apart a distance greater than the distance between said end walls of said island, allowing lateral movement of said switching plate relative to said island, thereby moving said first fiber into and out of abutting relation with said second and third fibers.

11. An optical switch according to claim 10, wherein said second and third fibers are spring-loaded towards said first fiber.

12. An optical switch according to claim 11, wherein said actuator plate further comprises camming means to cam said second or third fiber axially away from said first fiber, upon lateral movement of said actuator plate.

13. An optical switch for varying the light path of an optical fiber includes a first optical fiber mounted within a switch housing which is movable between first and second positions which places the first optical fiber into optical alignment with either a second or third optical fiber also mounted in the housing, and alignment means for optically aligning the first and second, and first and third optical fibers with end faces of the fibers in an opposed relationship, the switch being characterized in that:

the alignment means includes means to move the second or third optical fibers along an axial direction out of an abutting relationship with the said first optical fiber during a lateral movement of the opposed end faces, and for moving the second or third optical fibers into an abutting relationship when respective opposed end faces are aligned, said second and third optical fibers each including a band portion recessed from the end of the fiber and said moving means includes a plate member moveable in a lateral direction relative to the length of the fibers, said plate member including a recessed portion at one side facing said band, said plate member being moveable between first and second positions in which said bands on said second and third fibers, moving said second or third fiber axially forward and into an abutting relationship with the end of said first fiber.

14. An optical switch according to claim 12, characterized in that second and third fibers are spring-loaded towards said plate member.

15. An optical switch according to claim 13, characterized in that said bands are fiber optic connectors with said second and third fibers projecting outwardly therefrom.

16. An optical switch according to claim 13, characterized in that said plate member includes spring detent means for detenting said switch plate in said first and second positions.

17. An optical switch for varying the light path of an optical fiber includes a first optical fiber mounted in a switch housing which is movable between first and second positions which places the first optical fiber into optical alignment with either a second or third optical fiber mounted in the housing, and alignment means for optically aligning the first and second, and first and third optical fibers with end faces of the fibers in an opposed relationship, the alignment means including two channels extending substantially along the length of the second and third fibers and the first said fiber is movable between the two channels into and out of alignment with the second and third fibers, the switch being characterized in that:

a switching plate is moveable transversely of the channels and includes means for affixing an end of the first fiber thereto, the transverse movement of the plate transferring the first fiber into optical alignment with either the second or third fiber, the plate further comprising a recessed portion in a side edge thereof, and in that the second and third optical fibers each include a band therearound, with the recessed portion in the side edge of the switching plate facing the band portions, the switching plate being moveable between first and second switching positions wherein, in a first position, the second fiber is in optical alignment with the first fiber and the band portion of the second fiber is aligned with the recessed portion in the switching plate, moving the second fiber into an abutting relationship with the first fiber, and when the switching plate is moved from the first to a second position, the recessed portion cams against the band portion of the second fiber moving the second fiber out of an abutting relationship with the first fiber and the first said fiber is moved into optical alignment with the third fiber, and when the recessed portion is moved into alignment with the band portion on the third fiber, the band portion of the third fiber moves axially into the recessed portion and the third fiber moves into an abutting relationship with the first said fiber.

18. An optical switch for varying the light path of the optical fiber, comprising:

an insulating housing having two bores extending therein, said housing further comprising two alignment grooves therein;

a fiber optical connector positioned in each of said bores, each said connector having an optical fiber extending outwardly therefrom, where said fibers are positioned in respective alignment grooves;

two more connector receiving bores at an opposite end thereof, with two more connectors having fibers mounted therein positioned in said bores, said further fibers being positioned in alignment grooves at an opposite end thereof;

a switching fiber mounted within said housing having a portion fixed to said housing and free ends movable between the two alignment grooves into and out of position with said fibers in said grooves at each end of said housing;

means to move said free end of said switching fiber between said two grooves, into and out of optical alignment with said fibers in said grooves; and means to spring load said connectors inwardly to provide a spring loaded abutment between the aligned fibers.

19. The switch of claim 18, wherein said moving means comprises two switching plates where each plate operates one free end of said switching fiber, said switching plates being independently laterally movable, to vary the switching positions between said optical fibers in said fiber connectors.

* * * * *

UNITED STATES PATENT AND TRADEMARK OFFICE
CERTIFICATE OF CORRECTION

PATENT NO. : 5,035,482

DATED : July 30, 1991

INVENTOR(S) : Eduardus F.A. ten Berge et al

It is certified that error appears in the above-identified patent and that said Letters Patent is hereby corrected as shown below:

Title Page:
In the Abstract:

Lines 21, 27 and 29 - delete the word "fibers" and insert the word --fibres--.

Claim 2, column 9, line 8 - delete the word "V-groove" and insert the word -- V-grooves--.

Claim 13, column 10, line 60 - after the first occurrence of the word "said", insert the following: --recessed portion comes into and out of alignment with said--.

Claim 14, column 10, line 64 - delete "12" and insert --13--.

Claim 18, column 12, line 14 - delete the word "optical" and insert the word --optic--.

Signed and Sealed this

Twenty-fifth Day of May, 1993

Attest:

MICHAEL K. KIRK

Attesting Officer     Acting Commissioner of Patents and Trademarks